No. 787,214. PATENTED APR. 11, 1905.
J. H. E. PETERS.
LAWN TRIMMER.
APPLICATION FILED AUG. 29, 1904.

2 SHEETS—SHEET 1.

Witnesses
Geo. W. Young
L. E. Oliphant

Inventor
Johan H. E. Peters
By H. G. Underwood
Attorney

No. 787,214. PATENTED APR. 11, 1905.
J. H. E. PETERS.
LAWN TRIMMER.
APPLICATION FILED AUG. 29, 1904.
2 SHEETS—SHEET 2.
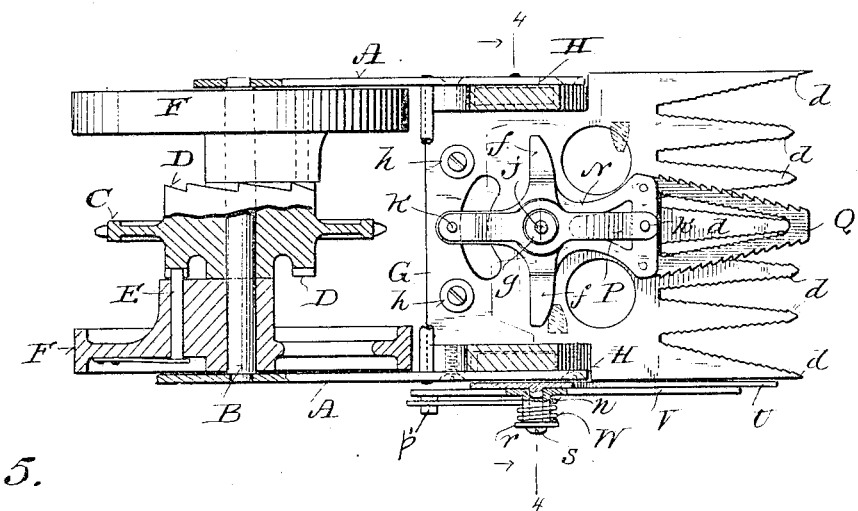
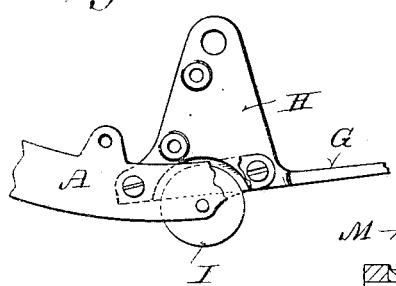
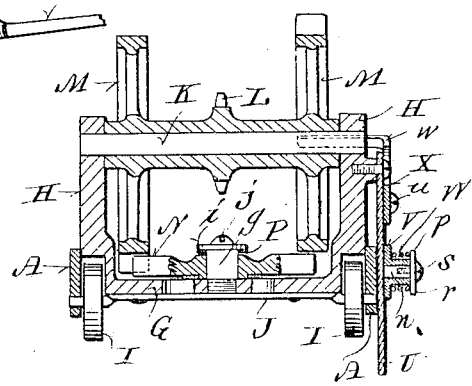
Witnesses
Geo. W. Young.
N. E. Oliphant
Inventor
Johan H. E. Peters,
By H. G. Underwood
Attorneys No. 787,214.　　　　　　　　　　　　　　　　　　　　Patented April 11, 1905.

UNITED STATES PATENT OFFICE.

JOHAN H. E. PETERS, OF WAUWATOSA, WISCONSIN.

LAWN-TRIMMER.

SPECIFICATION forming part of Letters Patent No. 787,214, dated April 11, 1905.

Application filed August 29, 1904. Serial No. 222,487.

*To all whom it may concern:*

Be it known that I, JOHAN H. E. PETERS, a citizen of the United States, and a resident of the town of Wauwatosa, in the county of Milwaukee and State of Wisconsin, have invented certain new and useful Improvements in Lawn-Trimmers; and I do declare that the following is a full, clear, and exact description thereof.

My invention consists in certain peculiarities of construction and combination of parts hereinafter particularly set forth with reference to the accompanying drawings and subsequently claimed, the object of the invention being to provide simple, economical, and efficient lawn-trimming machines.

Figure 1:
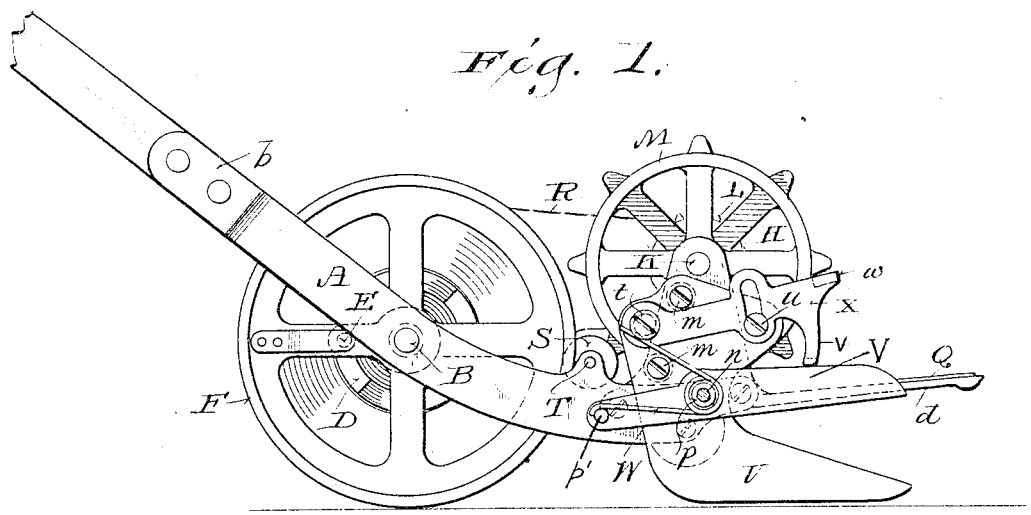
Figure 2:
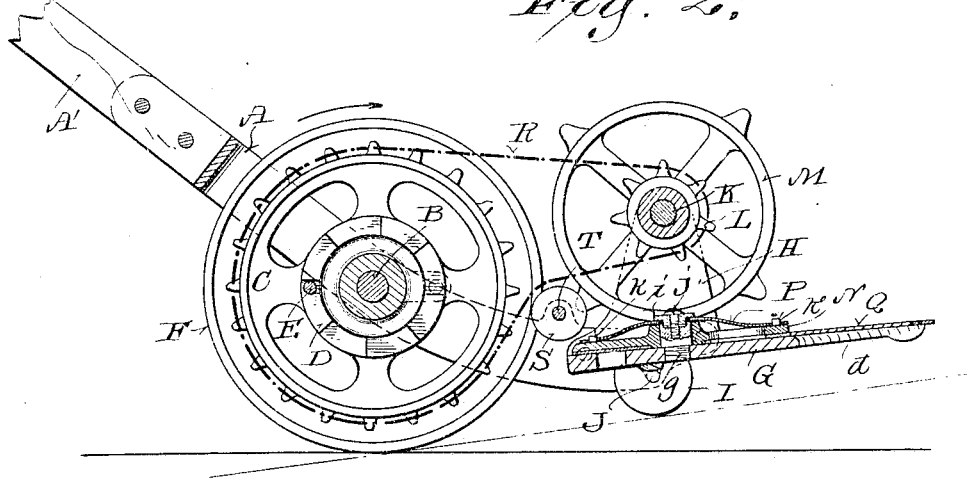

Figure 1 of the drawings represents a partly-sectional side elevation of a lawn-trimmer in accordance with my invention as organized for cutting grass borders; Fig. 2, a vertical longitudinal central section of the machine; Fig. 3, a plan view of the machine, partly in horizontal section, having the side bars thereof partly broken away; Fig. 4, a transverse section of the machine, this view being indicated by lines 4 4 in Fig. 3; and Fig. 5, a side elevation of a partly-broken fragment of the machine, the same being that portion of said machine to which an attachment is connected.

Referring by letters to the drawings, A indicates each of a pair of suitably-curved side bars having their rear ends bent inward at right angles and likewise bent toward the rear to form ears *b*, between which a handle A' is bolted or otherwise rigidly secured. Journaled at its ends in the side bars is a shaft B, and fast on this shaft midway of its length is a driving sprocket-wheel C, the hub of which is toothed at its ends to form ratchets D, engaged by spring-controlled pawls E, that extend through the hubs of traction-wheels F, loose on the shaft between the sprocket-wheel and said side bars. The pawl-and-ratchet mechanism is such that the sprocket-wheel C turns in the direction of the arrow in Fig. 2 when the machine is pushed ahead of the operator.

Between the side bars in front of the wheels aforesaid is a plate G, having its forward end longitudinally recessed to form a series of tapered shear-fingers *d*, the edges of which are preferably serrated, and this plate is provided with standards H, to which said side bars are fastened by screws or other suitable means. The plate G and standards H thereon are recessed to obtain clearance for supporting-wheels I, that are loose on an axle J, made fast to said plate under the same and caught in the side bars A aforesaid, these bars, said plate, and standards constituting what is hereinafter termed the "frame" of the machine.

Supported at its ends in the standards H is an arbor K, and loose on the arbor is a hub common to a central driven sprocket-wheel L and a pair of wiper-wheels M, these wiper-wheels being set to operate alternately upon lateral arms *f* of a rocker N on a pivot-stud *g* in screw connection with the rear portion of the plate G, central of the same, a relative position of wiper-wheel teeth being shown by dotted lines in Fig. 3. The narrow end of the rocker oscillates between stops *h* upon the plate G, and these stops are preferably antifriction-rollers loose on screw-pins in connection with said plate. A bow-spring P is engaged by a flanged washer *i*, set in a recess in the pivot-stud *g*, and a screw *j*, engaging said stud, has the head thereof in opposition to the washer. The ends of the spring are provided with apertures engaged by lugs *k* of the rocker, and said rocker is riveted or otherwise fastened on the tang of a forwardly-projecting blade Q in the form of a triangular plate having a triangular opening, the longitudinal cutting edges of this plate and opening therein being preferably serrated. The arrangement of the blade is such that it oscillates on the recessed forward end of the plate G, and the power of the spring P is such that said blade is held in frictional contact with said plate.

A link belt R is stretched on the sprocket-wheels C L, and the slack of the belt is supported by a roller S on a spindle T, mounted in sides of the machine-frame. The relative size of the sprocket-wheels is such that the one, L, is driven at a comparatively high speed, and the wiper-wheels M operate on the rocker-arms *f* to effect oscillation of the blade Q, that cuts grass caught between the fingers of the plate G when the machine is moved forward on its wheels F I aforesaid. The machine being moved rearward, the pawls E slip on the ratchets D to prevent operation of the link belt and sprocket-wheel gearing above specified. By means of the machine as thus far described the operator can cut close to houses, monuments, fences, and other objects, said machine being designed to cut where it is impossible to utilize an ordinary lawn-mower.

Detachably secured to one of the standards H by screws *m* or other suitable means is the tang of a shear-blade U in the form of a runner, by which the forward portion of the machine is elevated. Loose on a lateral stud *n* of the tang of the blade U is the outwardly-extended hub *p* of another shear-blade V, opposed by spiral coils of a spring W, held under tension on said hub by a washer *r* on a screw *s* engaging said stud. One end of the spring is caught on a lug *p'* of the shear-blade V, and its other end is caught under the head of a pivot-screw *t*, connecting a lever X with the tang of the shear-blade U, this lever being provided with a segmental slot engaged by another screw *u* set in said tang. A depending projection *v* of the lever bears on the forward portion of the shear-blade V, and an arm *w* of said lever is arranged to be operated upon by one of the wiper-wheels M, above specified. Downward movement of the shear-blade causes the blade V to rock on its pivot and cut grass caught between it and the blade U, the spring W being then contracted. The striker-wheel having cleared the lever-arm *w*, the spring W expands to return the blade V and lever X to normal position.

The detachable shear mechanism is employed in connection with the otherwise complete machine to cut grass along borders of lawns and flower-beds.

Having thus described my invention, what I claim as new, and desire to secure by Letters Patent, is—

1. A lawn-trimmer comprising a wheel-supported frame embodying a plate longitudinally recessed to form a series of forwardly-extending tapered shear-fingers, a triangular shear-blade in pivotal connection with the plate and arranged over the fingers of same, a rocker fast on the blade and provided with lateral arms, a bow-spring arranged to have its ends bear on the rocker, wiper-wheels arranged to operate alternately on the rocker-arms, and means for operating the wiper-wheels when the machine has forward travel.

2. A lawn-trimmer comprising a frame embodying a plate having forwardly-extended tapered shear-fingers, a rear shaft journaled at its ends in the sides of the frame, a sprocket-wheel fast on the shaft, traction-wheels loose on said shaft and having slip-clutch connection with the hub of the sprocket-wheel to turn the latter when the machine has forward travel, supporting-wheels on a front axle of the machine, a triangular shear-blade in pivotal connection with said plate over the fingers of same, a rocker fast on the blade and provided with lateral arms, a bow-spring arranged to have its ends bear on the rocker, a forward arbor supported in the machine-frame, a sprocket-wheel and wiper-wheels having a common hub loose on the arbor, the wiper-wheels being set to operate alternately on the rocker-arms, a link belt stretched on the sprocket-wheels, and a roller arranged to support slack of the belt.

3. A lawn-trimmer comprising a wheel-supported frame having forwardly-extending tapered shear-fingers, a pivotal triangular shear-blade over the fingers, means holding the blade in frictional contact with said fingers, an attachment consisting of a runner in the form of a shear-blade having a tang for detachable connection with the machine-frame at one side of the same, a spring-controlled shear-blade and lever in pivotal connection with said tang, the lever being segmentally slotted on a guide and having a depending projection opposing the latter shear-blade, a rocker mounted on the triangular shear-blade, wiper-wheels operative in conjunction with arms of the rocker, an arm extending from said lever in the path of teeth of one of the wiper-wheels, and means for actuating said wheels when the machine has forward travel.

In testimony that I claim the foregoing I have hereunto set my hand, at Milwaukee, in the county of Milwaukee and State of Wisconsin, in the presence of two witnesses.

JOHAN H. E. PETERS.

Witnesses:
   N. E. OLIPHANT,
   GEO. G. FELBER.